Oct. 13, 1942.   M. O'FARRELL   2,298,719
IMPLEMENT RETAINER
Filed Dec. 12, 1940   2 Sheets-Sheet 1
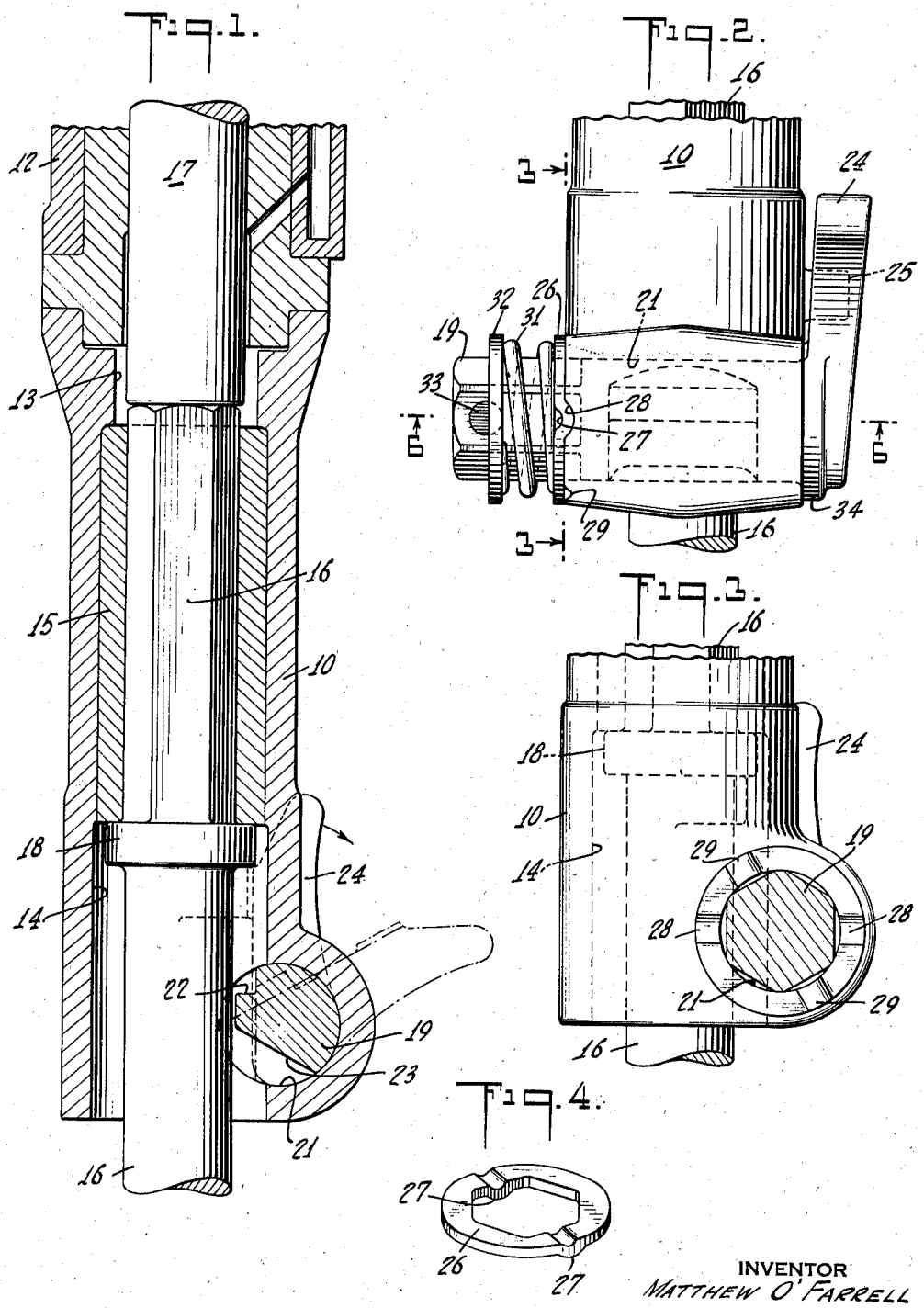
INVENTOR
MATTHEW O'FARRELL
BY
Raymond G. Mullee
ATTORNEY INVENTOR
MATTHEW O'FARRELL
BY
Raymond G. Mullee
ATTORNEY Patented Oct. 13, 1942

2,298,719

UNITED STATES PATENT OFFICE 2,298,719

IMPLEMENT RETAINER

Matthew O'Farrell, Detroit, Mich., assignor to Chicago Pneumatic Tool Company, New York, N. Y., a corporation of New Jersey Application December 12, 1940, Serial No. 369,811

1 Claim. (Cl. 279—19.5)

This invention relates generally to percussive tools of the type having a removable working implement arranged in the front head of the tool in position to receive impacts from a hammer piston and movable longitudinally to transmit such impacts to the work. More particularly the invention is concerned with a combination of elements, including a working implement retainer, for preventing accidental removal of the implement from the tool.

The retainer represents the principal element of the combination and, in the present embodiment of the invention, is a cylindrical latch-like member mounted within the front head transversely of the working implement and rotatable to effective and ineffective positions relatively to the implement. Other elements of the combination include a detent mechanism for holding the retainer latch in each of its rotative positions and a spring serving the dual purpose of supplying a yielding pressure to the detent mechanism, and holding the retainer against axial movement.

The principal object of the invention is to obtain a simple and rugged working implement retainer of the latch type, especially adapted for use in demolition tools.

Another object of the invention is to simplify the tool construction by mounting the yielding control means for the implement retainer on a projecting portion of the retainer outside the front head.

Other objects and structural details of the invention will be apparent from the following description when read in conjunction with the accompanying drawings, wherein:

Fig. 1 is a fragmentary view, in longitudinal section, of the front head of a demolition tool in which the implement retainer mechanism of the invention has been embodied;

Fig. 2 is a fragmentary view, in front elevation, of the tool shown in Fig. 1;

Fig. 3 is a view of the tool, partly in side elevation and partly in cross section, taken along the line 3—3 of Fig. 2;

Fig. 4 is a detail view, in perspective, of a detent washer forming part of the retainer mechanism;

Figs. 5 and 6 are on a larger scale than Figs. 1 to 4.

Figure 5:
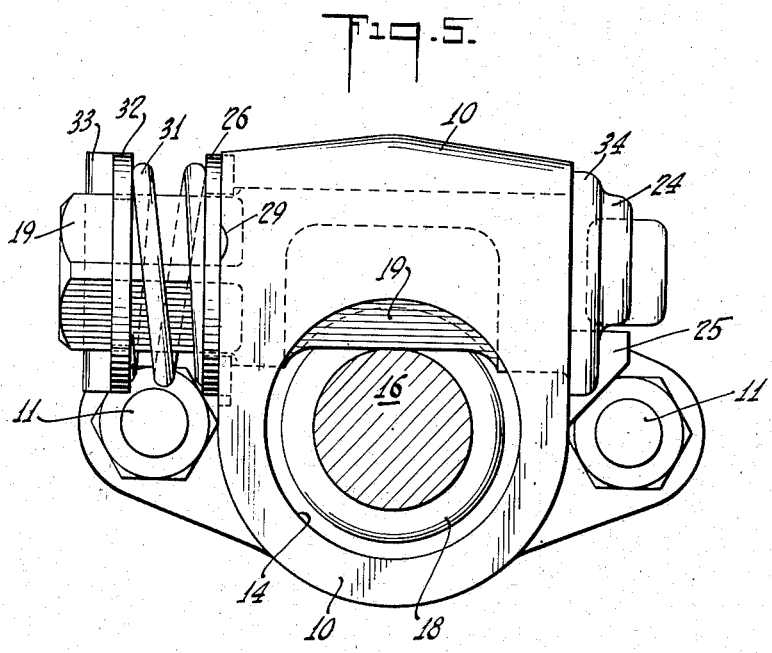
Fig. 5 is a view in end elevation of the lower end of the front head.

The drawings thus illustrate the front head of a well known type of demolition tool, modified in accordance with the present invention. Referring to Fig. 1 it will be seen that the mechanism of the front head includes a principal supporting element in the form of a tubular casing 10 which is secured by side bolts 11 (Figs. 5 and 6) to the main tool cylinder 12. The casing 10 constitutes an extension of the cylinder 12 and has a longitudinal bore 13 communicating with a central opening in the cylinder. A counterbore 14 extends rearwardly from the front end of the casing 10 and there is pressed therein a chuck bushing 15 adapted to receive the shank of a working implement 16. Substantially aligned with the working implement 16 and reciprocable within the cylinder 12 is a hammer piston 17, the front end of which is arranged to project into the bore 13 to deliver impacts to the working implement. The inner end of the working implement is positioned in the path of the hammer piston 17 while the outer end of the implement projects outside the casing for engagement with the work. The implement 16 is reciprocable within the tubular casing 10 and under the force of blows delivered by the hammer piston 17 may be driven forwardly through the work. The tool, during the operation thereof, is pressed toward the work so that the parts are maintained constantly in substantially the position shown in Fig. 1, in which an annular collar 18 on the working implement engages the front end of the chuck bushing 15 to limit rearward movement of the implement.

Should operation of the hammer piston 17 be initiated with the working implement not pressed against the work, the implement might be ejected from the tool as a projectile from a gun. Such accidental removal is, of course, undesirable and is in fact a potential source of injury to the operator and near-by workmen. To guard against this contingency it is customary to provide in tools of this class an adjustable retaining means for locking the working implement within the tool. In the present tool the retaining means comprises primarily a cylindrical bolt or latch 19 disposed in a transverse bore 21 formed in an enlarged portion of the tubular casing 10 adjacent the front end thereof. The transverse bore 21 intersects the longitudinal bore 14 and the mid-portion of the latch 19 is formed with a shouldered abutment 22 which projects into the bore 14 in the path of the annular collar 18. The latch 19 is rotatable within the bore 21 and is formed in addition to the shouldered portion 22 with a recessed or cut away portion 23 lying outside the path of the collar 18. The latch 19 is thus settable to two rotative positions relatively to the working implement 16, and is respectively effective and ineffective in these positions to prevent removal of the implement from the tool. When inserting the implement 16 into the tool, or withdrawing it therefrom, the latch 19 is set to the broken line position of Fig. 1. In this position of the latch the recessed portion 23 is brought to cooperative relation with the working implement and the latch is hence ineffective to prevent the free movement of the implement into or out of the bore 14. Movement of the latch to the full line position of Fig. 1 serves to return the shouldered portion 22 to the bore 14 and thereby render the latch again effective. In this position of the latch forward movement of the working implement is limited by engagement of the collar 18 with the abutment 22 and accidental removal of the implement positively prevented. As shown in Fig. 2 the right hand end of the latch 19 extends outside the transverse bore 21 and has an integrally formed arm 24 adapted to be manipulated to set the latch to each of its rotative positions. The abutment 22 of the latch 19 lies inwardly of the axis of rotation of the latch, so that its engagement by the collar 18 serves to urge the latch in a counterclockwise direction as viewed in Fig. 1. To prevent such movement a stop in the form of a bent over ear 25 (Fig. 2) is provided on the side of the tubular casing 10 in the path of movement traversed by the arm 24. The stop 25 is so positioned as to prevent rotary movement of the latch 19 in a counterclockwise direction beyond the point indicated in Fig. 1.

Figure 6:
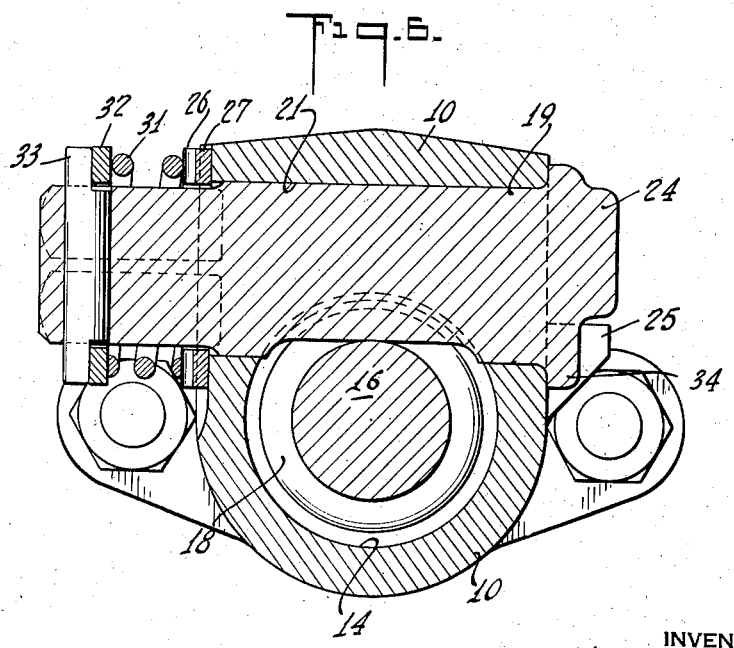
Fig. 6 is a view in cross section taken through the retainer latch, substantially along the line 6—6 of Fig. 2.

In order that the latch 19 may not be jarred from effective or retaining position by the vibration incident to operation of the tool a detent means is provided for yieldingly holding the latch against rotary movement. Referring to Figs. 2, 5 and 6, the left hand end of the latch 19 extends, like the right hand end thereof, outside the bore 21. The leftward projecting portion of the latch has the polygonal shape best seen in Fig. 3, and there is mounted thereon a detent washer 26. As shown in Fig. 4, the inner periphery of the washer 26 has the same polygonal form as the outer end of the latch 19, so that the washer is constrained to rotate with the latch although movable relatively thereto in a longitudinal direction. The inner face of the washer 26 normally contacts the side wall of the casing 10 and is formed with a pair of oppositely disposed detents 27 adapted for engagement in complementary notches arranged around the periphery of the bore 21. The detent notches are formed in two spaced pairs 28 and 29 with each of which the detents 27 may be alternatively engaged. The spacing of the notches 28 and 29 is such as to cause the detent washer 26 to engage one pair of notches in the effective position of the latch 19 and to engage the other pair of notches in the ineffective position of the latch. Movement of the washer 26 out of detenting position is resisted by the yielding pressure of a coil spring 31 surmounting the projecting end portion of the latch 19. The spring 31 is compressed between the outer face of the detent washer 26 and a fixed spring base assembly comprising a washer 32 and a limit pin 33 passed transversely through the outer end of the latch. The pin 33 limits axial movement of the washer 32 in a direction away from the detent washer and the spring 31 is therefore maintained in a state of compression and the washer 26 is pressed into cooperative relation with the detent notches 28 and 29. The opposite ends of the limit pin 33 are cut away (see Fig. 6) to receive the washer 32 and the pin is thereby locked against axial displacement.

It will be observed that in pressing the washer 26 to detenting position the spring 31 acts also to urge the latch body leftward within the bore 21. A shoulder 34 on the right hand end of the latch limits such movement by engaging the casing 10. Through the co-action of the spring 31 and shoulder 34, therefore, the latch 19 is held in its proper position within the front head.

What is claimed is:

In the front head of a percussive tool, a longitudinal bore adapted to receive a reciprocable working implement, a cylindrical transverse bore in said head intersecting said longitudinal bore, a cylindrical working implement retaining element rotatably mounted in said transverse bore and formed with projecting portions lying outside the respective ends of said bore, a stop portion formed within the periphery of said retaining element and rotatable into and out of cooperative relation with the working implement, a handle on said retaining element outside the front head and manipulative to set said element to rotative positions of adjustment, an arcuate flange forming an abutment shoulder on one end of said retaining element engageable with said front head to limit axial movement of said element in one direction, a spring surrounding the other end of said element, a base assembly for said spring comprising a washer surrounding said other end of said element adjacent its outer extremity and a limit pin extending transversely through said element and interlocked with said washer, said spring being interposed between said base assembly and said front head and pressing said element in a direction to engage said abutment shoulder with the front head, and detent means for said element controlled by said spring.

MATTHEW O'FARRELL.